United States Patent
Weber et al.

(10) Patent No.: US 6,214,106 B1
(45) Date of Patent: *Apr. 10, 2001

(54) SILANE TREATED INORGANIC PIGMENTS

(75) Inventors: Leon Weber, Baltimore; Robert J. Kostelnik, Ellicott City, both of MD (US); Charles Wheddon, South Humberside (GB)

(73) Assignee: Millenium Inorganic Chemicals, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/077,430

(22) PCT Filed: Nov. 27, 1996

(86) PCT No.: PCT/US96/18941

§ 371 Date: Oct. 28, 1998

§ 102(e) Date: Oct. 28, 1998

(87) PCT Pub. No.: WO97/20001

PCT Pub. Date: Jun. 5, 1997

Related U.S. Application Data

(63) Continuation-in-part of application No. 08/565,852, filed on Dec. 1, 1995, now Pat. No. 5,653,794.

(51) Int. Cl.$^7$ .................................. C09C 1/36; C09C 3/12
(52) U.S. Cl. .................. 106/442; 106/421; 106/426; 106/435; 106/445; 106/446; 106/450; 106/452; 106/454; 106/457; 106/459; 106/490; 428/405

(58) Field of Search ..................... 106/421, 426, 106/435, 442, 444, 445, 446, 450, 452, 454, 457, 459, 490; 428/405

(56) References Cited

U.S. PATENT DOCUMENTS

| | | | |
|---|---|---|---|
| 4,022,152 | 5/1977 | Laüfer et al. ...................... | 118/49.5 |
| 4,072,796 | 2/1978 | Reinhardt et al. .................... | 428/405 |
| 4,375,989 * | 3/1983 | Makinen ............................ | 106/438 |
| 5,501,732 * | 3/1996 | Niedenzu et al. .................... | 106/447 |
| 5,653,794 * | 8/1997 | Weber et al. ........................ | 106/442 |

FOREIGN PATENT DOCUMENTS 492 223 * 7/1992 (EP) .

* cited by examiner

Primary Examiner—Anthony Green
(74) Attorney, Agent, or Firm—Kalow & Springut LLP; John J. Santalone, Esq.

(57) ABSTRACT

The present invention provides a process for the production of hydrophobic inorganic oxide products which comprises reacting the inorganic oxide particles with organohalosilanes, preferably organochlorosilanes, to produce hydrophobic organosilane coated inorganic oxides. It is preferred that the organohalosilane compounds be reacted with the inorganic oxide particles in an aqueous slurry and subjected to intense mixing. The inorganic oxide pigments prepared by the processes of this invention have essentially quantitative retention of the organosilanes and contain no adsorbed aldehydes on their surface. The by-products produced in the preferred embodiments of the invention are innocuous salts, which are environmentally safe and readily disposable.

23 Claims, No Drawings

SILANE TREATED INORGANIC PIGMENTS

CROSS-REFERENCE TO RELATED APPLICATIONS

This application is a continuation-in-part of application U.S. application Ser. No. 08/565,852, filed Dec. 1, 1995, now U.S. Pat. No. 5,653,794 the contents of which are hereby incorporated by reference into the present disclosure.

BACKGROUND OF THE INVENTION

The present invention relates to hydrophobic, surface modified, inorganic metal oxide pigments, such as titanium dioxide ($TiO_2$) pigments, which are substantially free of aldehydes and other potentially volatile organic compounds on their surface. The invention also relates to an improved, environmentally safer method for the preparation of such pigments and to polymers containing such pigments.

Titanium dioxide is the premier white pigment used for whitening, brightening and opacifying paper, paints and plastics. As normally produced, $TiO_2$ is a hydrophilic pigment, meaning that it is readily wet by water and not wet by hydrophobic materials like organic polymers. In order to permit $TiO_2$ pigments to be wet-out by and dispersed in organic polymers, the surface of the pigment must be modified, or made hydrophobic, so that the polymer will spread over the pigment's surface and good adhesion between the pigment and polymer will occur.

Prior art references teach the preparation of hydrophobic $TiO_2$ pigments by treatment with "non-reactive" organic substances, such as polydimethylsiloxanes (see e.g., Noll, Chemie und Technologie der Silicon, 2nd ed., 1968, page 386 et seq.), polyorganosiloxanes (see e.g., U.S. Pat. No. 4,810,305) and phosphorylated fatty acid derivatives (see e.g., U.S. Pat. No. 4,209,430). These prior art, non-reactive organic substances interact with the metal oxide's surface partially or completely through Van Der Waals forces and/or electrostatic interactions. Since these forces are comparatively weak, pigments treated with these organic substances may lose the coatings in later processing stages or the organic substances may be extracted from the pigments during use.

The use of "reactive" organic compounds to modify the surface of metal oxide pigments is also well known. U.S. Pat. Nos. 4,061,503 and 4,151,154 (both assigned to Union Carbide) disclose reactions of organosilanes with $TiO_2$ to produce hydrophobic $TiO_2$ pigments which enhance dispersibility in polymer matrices such as paints and plastics. In these patents the $TiO_2$ surface is treated with a silane possessing at least two hydrolyzable groups bonded to the silicon and an organic group containing a polyalkylene oxide group. The hydrolyzable groups are described as alkoxys, such as methoxy and ethoxy. More specifically, U.S. Pat. No. 4,061,503 (which issued Dec. 6, 1977) describes the use of a polyethyl substituted silicon compound having alkoxy-containing hydrolyzable groups with from about 1 to about 4 carbon atoms. U.S. Pat. No. 4,151,154 (which issued Apr. 24, 1979) also discloses the treatment of titanium dioxide pigments with organosilicon compounds to improve dispersibility in polymers, similar to the '503 Patent, except its claims are directed to inorganic oxide particles generally and not just titanium dioxide.

European Patent Application No. 492,223 (published Jul. 1, 1992) discloses the treatment of $TiO_2$ pigment with an organosilicon compound having the formula $R^1 R^2 R^3 R^4 Si$ wherein $R^1$ is a halogen or an alkoxy radical with 1 to 10 carbon atoms, $R^2$ is an alkyl group with 1 to 30 carbons (preferably more than 8), and $R^3$ and $R^4$ are the same as either $R^1$ or $R^2$.

Great Britain Patent No. 1,154,835 (published Jun. 11, 1969) discloses a process for the treatment of finely divided materials, including titanium dioxide pigment. The patent indicates that inorganic powders may be rendered hydrophobic by treatment with organosilicon compounds. Specifically, the silicon compound has the formula $R_n SiX_{4-n}$ wherein X is a halogen atom or a hydrolyzable alkoxy radical and R is a monovalent hydrocarbon radical (including an octyl [8 carbons] or an octadecyl [18 carbons] radical) and n has the value of either 0 or 1.

Suzuki, et al., "*Chemical Surface Treatment of Alumina, Titania, and Talc and Their Respective Surface Properties,*" Shikizai, [J. Jap. Soc. Col. Mat.], Vol. 65, No. 2, pp. 59–67, 1992, describes the surface treatment of titania (large titanium dioxide crystals). As a comparison, the article refers to titanium dioxide particles that have been treated with octadecyltriethoxysilane—[the nonhydrolyzable group is octadecyl (18 carbons); the hydrolyzable groups are ethoxy]—to improve the particles' dispersibility properties in organic solutions and solvents.

Union Carbide's A-137 Product Information brochure (copyrighted 1991) cites to a organosilane compound wherein the nonhydrolyzable group has 8 carbons and the hydrolyzable group is ethoxy.

Great Britain Patent 785,393 discloses the treatment of $TiO_2$ pigment with organosilanes to improve uniformity of coloration and to reduce streaking in polymer matrices. Table 1 discloses the use of nonyltriethoxysilane (the non-hydrolyzable group has 9 carbon atoms; the hydrolyzable group is ethoxy) and the use of ethyltrichlorosilane (the nonhydrolyzable group is ethyl; the hydrolyzable group is chloro).

Great Britain Patent 825,404 discloses a treatment of $TiO_2$ pigment to improve dispersibility in organic solvents, including paint. In the patent, the organosilanes are represented by the formula $R_{4-n}Si(OR^1)_n$ wherein R and $R^1$ represent alkyl, aryl, or a hydrogen group. The preferred compounds include dimethyl-diethoxysilane, methyltriethoxysilane, ethyltriethoxysilane, and phenyltriethoxysilane.

U.S. Pat. No. 4,141,751 discloses the treatment of $TiO_2$ pigment with one of three different agents to improve the pigment's dispersion properties in various polymers. In one embodiment, the agent is $R-Si-X_3$ wherein R can be an aliphatic or cycloaliphatic and X is a halogen or an alkoxy group. Preferably, the treating agent is a methyltrimethoxysilane.

Recently, several PCT patent applications by DuPont have published in which organosilanes, similar to those disclosed in the above cited references, are used for surface treatment of $TiO_2$ pigment. For example, PCT patent publication WO 95/23192, published Aug. 31, 1995, discloses polymer matrices containing silanized $TiO_2$ pigments in which a coating on the pigments contains an organosilicon compound having the formula:

$$R_x Si(R^1)_{4-x},$$

wherein R is a nonhydrolyzable aliphatic, cycloaliphatic or aromatic group having 8 to 20 carbon atoms; $R^1$ is a group selected from alkoxy, halogen, acetoxy or hydroxy or mixtures thereof; and x=1 to 3. Although halogens are mentioned as suitable hydrolyzable groups, all examples and preferred embodiments specify alkoxy groups. Specifically, the publication discusses the use of octyltriethoxysilane—[the nonhydrolyzable group is octyl or 8 carbons; the hydrolyzable group is ethoxy]. As obvious from the above discussion of the prior art, the DuPont patent application repeats various teachings already disclosed in the Union Carbide patents and the other documents cited above.

DuPont's application WO 95/23194 discloses a process for preparing silanized titanium dioxide pigments by media milling in which an aqueous slurry of the pigment is adjusted to pH 7.5 to 11, then treated with an organosilicon reagent. The reagent is essentially the same as that specified in WO 95/23192, and preferably one which contains an alkoxy hydrolyzable group, such as methoxy or ethoxy.

DuPont's application WO 95/23195 discloses titanium dioxide pigments which are treated with organosilicon compounds and boric acid or boron oxide. The boron ingredient can be dissolved in the organosilicon compound and the admixture applied to the pigments by dry mixing or in an aqueous slurry. The organosilicon compound again preferably contains an hydrolyzable alkoxy group.

As can be seen from the above discussion, organoalkoxysilanes have been traditionally used in the prior art for hydrophobizing inorganic pigments, such as $TiO_2$. A major deficiency of procedures that use alkoxy silanes is the generation of volatile organic compounds (VOC's), such as methanol or ethanol, during hydrolysis of the silanes, according to the equation:

$$R\text{-}Si(OCH_2CH_3)_3 + 3H_2O \rightarrow R\text{-}Si(OH)_3 + 3CH_3CH_2OH$$

Producers of minerals treated with organoalkoxysilanes are obligated to protect their workers and the environment by collecting and disposing of these volatile organic compounds, which can often be expensive and time-consuming. A further deficiency of utilizing alkoxyorganosilanes is that under conditions encountered during processing and finishing the treated pigments, a portion of the volatile alcohol can be converted to noxious aldehydes. For example, ethanol can be oxidized to acetaldehyde which can remain on the surface of the inorganic oxide and be subject to evolution during further processing of the inorganic oxide by the inorganic oxide producer or customer. Further, alkoxyorganosilanes are among the most expensive organic materials known for hydrophobizing pigment surfaces.

Organohalosilanes are alternatives to organoalkoxysilanes for the treatment of inorganic oxide pigments. However, since these compounds, particularly the organohalosilanes, react vigorously with moisture and water, it would be expected that these reagents would have to be applied to the inorganic oxides dry or using nonaqueous, organic media.

SUMMARY OF THE INVENTION

The present invention provides an environmentally safer process for the production of hydrophobic inorganic oxide products which comprises reacting the inorganic oxide particles with condensation products from organohalosilanes, preferably organochlorosilanes, to produce hydrophobic organosilane coated inorganic oxides. It is preferred that the organohalosilane compounds be reacted with the inorganic oxide particles in an aqueous slurry under pH and mixing conditions sufficient to cause the desired reaction to take place.

The inorganic oxide pigments prepared by the processes of this invention have essentially quantitative retention of the organosilanes and contain no adsorbed aldehydes on their surface, unlike pigments produced by prior art methods using organoalkoxysilanes, which are later released as volatile organic compounds (VOC) in later stages of pigment processing or use. The by-products produced in the preferred embodiments of the invention are innocuous salts, which are environmentally safe and readily disposable.

DETAILED DESCRIPTION OF THE INVENTION

This invention provides hydrophobic inorganic oxide products which are free of adsorbed aldehydes and other potentially volatile organic compounds. The products of the present invention are produced by a process which overcomes the environmental deficiencies of prior art processes while, unexpectedly, maintaining or improving upon the processibility characteristics (e.g., dispersibility properties and lacing resistance) of such products in paints, plastics and other materials.

This section details the preferred embodiments of the subject invention. These embodiments are set forth to illustrate the invention, but are not to be construed as limiting. Since this disclosure is not a primer on the manufacture of inorganic oxide products or pigments or their treatment with organosilane compounds, basic concepts known to those skilled in the art have not been set forth in detail. Concepts such as choosing proper solvents or reaction conditions are readily determinable by those skilled in the art. Attention is directed to the appropriate texts and references known to those in the art for details regarding acceptable temperatures, solvents, curing agents, etc.

Inorganic oxides appropriate for use in the present invention include those which have surface hydroxyls capable of condensing with reactive organohalosilanes or condensates of organohalosilanes. Such inorganic oxides are represented by the rutile and anatase forms of titanium dioxide, kaolin and other clays, alumina, silica, aluminum trihydrate, zirconium oxide, zinc oxide, iron oxide, cadmium pigments, chromate pigments, chromium oxide pigments, glass fibers, glass flake, wollastonite and the like. Preferred are standard pigment-grade titanium dioxides, regardless of whether they have been obtained from titanium tetrachloride or from titanium sulfate.

The inorganic oxide being coated with the condensates of the organohalosilane can be an untreated inorganic oxide or an inorganic oxide whose surface has been treated by deposition thereon of phosphate, alumina, silica, zirconia and the like, using procedures well known to practitioners in the field of inorganic oxide surface treatment.

Suitable organohalosilanes for use in the present invention are represented by the formula $$R_n SiX_{4-n}$$

where R represents a nonhydrolyzable aliphatic, cycloaliphatic or aromatic group (including saturated or unsaturated, branched or unbranched alkyl, aryl, cycloalkyl or alkylaryl groups) having from 1 to 20 carbon atoms or a polyalkylene oxide group; X represents a halogen and n=1, 2, or 3.

For example, organochlorosilanes useful in this invention include butyltrichlorosilane, hexyltrichlorosilane, octyltrichlorosilane, octylmethyldichlorosilane, decyltrichlorosilane, dodecyltrichlorosilane, tridecyltrichlorosilane, dihexyldichlorosilane, dioctyldichlorosilane, octadecyltrichlorosilane, and tributylchlorosilane. Preferred organochlorosilanes have R groups with 4 to 10 carbons; most preferred are those with 6 to 8 carbons. Hexyltrichlorosilane and octyltrichlorosilane are commercially and economically available and result in organosilane-coated inorganic oxide pigments that have excellent dispersibility properties in plastics, and (particularly in the case of hexyltrichlorosilane) produce pigmented plastics with excellent lacing resistance.

The organohalosilanes can be employed in the invention individually or as mixtures of two or more species. The organohalosilane weight content, based upon the weight of the silanized inorganic oxide, is typically about 0.1 to about 5.0%. For organochlorosilanes, the preferred weight content is about 0.1 to about 2% and most preferably about 0.5 to about 1.5%.

The reacting of the inorganic oxide particles with the organohalosilanes in accordance with the invention may be accomplished by any suitable method by which surface treatment agents, coupling agents and the like are supplied to particulate surfaces. Suitable methods include those known to practitioners in the field of surface treatment of inorganic oxides, including the methods described in the prior art with respect to the treatment of titanium dioxide pigment with organoalkoxysilanes (e.g., spraying the organohalosilanes onto the pigment or grinding the organohalosilanes and pigment in a fluid energy mill). Suitable methods also include those utilized for the treatment of materials such as silicic fillers with organohalosilicon compounds.

However, it is preferred that the condensates of the organohalosilanes are reacted with the inorganic oxide pigments in an aqueous medium under acidic conditions. It has been surprisingly discovered that condensates of the organohalosilanes can be made to react with inorganic oxides in aqueous environments if the admixture of the organohalosilanes and the inorganic oxide particles are subjected to intense mixing under acidic conditions.

The fact that condensates of the organohalosilanes can be made to react with inorganic oxides in an aqueous slurry is surprising since organohalosilanes, particularly organochlorosilanes, react vigorously with moisture and water. Accordingly, it would have been expected that these substances must be applied to the inorganic oxides dry or using nonaqueous, organic media. Conventional wisdom would predict that if the organohalosilane was applied to inorganic oxides in an aqueous system, the organohalosilane would rapidly hydrolyze and form oligomers and polymers that would not react with hydroxyl groups on the inorganic oxide's surface. See, e.g., Smith, A. L., *Analytic History of Silicones*, Wiley & Sons, 1991, pages 10–11, 29–30 and 256–257; Elvers, B. et. al., *Ullman's Encyclopedia Of Industrial Chemistry*, 5th Ed., Vol. A 24 (1993), pp. 30–31; and Goldschmidt et al., *Silicones: Chemistry and Technology*, CRC Press, Boca Raton, Fla., 1991, pp. 98–99.

Unexpectedly, it has been found that condensates of the organohalosilanes can be made to react with the surface of inorganic oxides in aqueous suspension by providing an acidic environment and sufficient mixing and curing. Although not wishing to be bound by a particular theory or mechanism of operation, the inventors present the following explanation to aid in an understanding of the invention.

When the titanium dioxide/organohalosilane reaction is conducted in an aqueous medium, the organohalosilane, e.g., octyltrichlorosilane, is added to a treatment vessel containing a slurry composed of predominantly water with a small volume percentage of titanium dioxide particles. If octyltrichlorosilane is added to pure water or to a neutral (non-acidic) water dispersion or slurry of titanium dioxide, there is an extremely fast reaction of octyltrichlorosilane forming hydrochloric acid and a sticky resin from the polymerization of the silane portion of the octyltrichorosilane molecule. As noted in Smith, *The Analytical Chemistry of Silicones*, "One's first encounter with chlorosilanes is usually sufficient to instill a respect of their reactivity. The briefest exposure to atmospheric moisture when loading a syringe and injecting a specimen into a chromatograph results in the evolution of hydrogen chloride [hydrochloric acid] and the appearance of siloxanes in the chromatogram." p. 256.

Even though the titanium dioxide may be treated at solids levels of 500 grams per liter of slurry or higher, the system is mostly water as the volume occupied by the titanium dioxide particles is only about 8% of the system and that of water is about 92%. Consequently, as octyltrichorosilane is added to the treatment vessel, the probability of reacting with water is extremely high and quite low with respect to the titanium dioxide.

It is contemplated that this aspect of the invention regarding the reaction of condensates of the organohalosilanes with inorganic oxides in an aqueous system may be useful in fields outside of the treatment of inorganic oxides. Materials (besides inorganic oxides) that are presently treated with organohalosilanes in nonaqueous, organic media may be suitable for treatment in aqueous systems in accordance with this disclosure. Such treatment procedures may provide environmental and/or cost benefits such as the easy disposal of by-products, as discussed above with respect to inorganic oxide treatment.

In a preferred embodiment of the invention, the organohalosilane is added to a stirred, aqueous slurry of the inorganic oxide at a solids level of about 50 to 500 grams inorganic oxide per liter of water, preferably at a solids level of 300 to 400 grams per liter, at an initial pH less than about 11, preferably less than about 7, most preferably between 2 and 6. The pH can be allowed to drift downward as the organohalosilane is added or can be maintained at a desired value by adding base concurrently with the organohalosilane. The organohalosilane can be added dropwise into the stirred slurry, pumped into the slurry or pumped into a slurry recirculation line or added by any other suitable method. The rate of organohalosilane addition is such that all of the organohalosilane is added in about 1 minute to about 3 hours or longer, with a preferred addition time of 5 minutes to 1 hour and a most preferred addition time of about 10 minutes to about 45 minutes. The temperature of the organohalosilane treatment can be any suitable treatment temperature up to approximately the boiling point of the water. Preferably the treatment temperature is between 25 and 90° C., and most preferably between 60 to 80° C.

Following treatment of the inorganic oxide, the slurry pH is adjusted to a desired value, typically between 2.0 and 8.0, more typically between 4.0 and 6.0, preferably using sodium hydroxide, and the slurry is allowed to age with mixing for the time, preferably up to about 1 hour, required to assure equilibrium distribution of the components of the slurry.

Following aging, the pH of the slurry is adjusted to about 6.0 or greater, preferably between about 6.0 to 9.0, and the organosilane coated inorganic oxide is collected using filtration, centrifugation or any other suitable technique, washed to remove soluble impurities (such as by-product salt), dried and further processed into a finished product using techniques suitable for the specific inorganic oxide being processed.

The use of organohalosilanes avoids formation of volatile organic compounds, such as methanol and ethanol, which arise from the hydrolysis of traditional organoalkoxysilanes. The innocuous salts, such as sodium chloride, which result from treatment of inorganic oxides with organohalosilanes followed by neutralization, are easily disposed of and do not pose a threat to the environment and health as do the volatile alcohols. In addition, the use of organohalosilanes eliminates the formation of noxious aldehydes which can form during inorganic oxide pigment processing. The noxious aldehydes can present an environmental hazard during pigment preparation and residues can present a threat during silanized pigment use in plastics applications.

The inorganic metal oxide pigments of this invention are unique in that they are not contaminated by measurable amounts of potentially hazardous oxidized by-products of prior art processes, e.g., aldehydes. The hydrophobic inorganic oxide products of this invention offer processibility in polymer composites as least as good as pigments prepared according to prior art procedures; that is, the dispersibility of the products of the present invention in polymers is at least as good as prior art inorganic oxide pigments and the lacing resistance of the resulting polymer composites containing the products of the present invention is as good as prior art polymer composites. Representative polymers in which the products of the present invention may be used include, but are not limited to, polymers of ethylenically unsubstituted monomers, including polyethylene, polypropylene, polybutylene and copolymers of ethylene with alpha-olefins containing 4 to 12 carbon atoms or vinyl acetate; vinyl homopolymers, acrylic homopolymers and copolymers, polyamides, polycarbonates, polystyrenes, acrylonitrile-butadiene-styrenes, polyethers and the like.

The following examples set forth preferred embodiments of the invention. These embodiments are merely illustrative and are not intended to, and should not be construed to, limit the claimed invention in any way.

EXAMPLES

Comparative Examples 1–4 demonstrate the metal oxide pigments treated with organotriethoxysilanes of the prior art contain associated aldehydes while the pigments of the present invention do not.

Comparative Example 1

800 grams of neutral tone, chloride process, $TiO_2$ product containing about 1.3% $Al_2O_3$ and about 0.15% $P_2O_5$ were slurried with 800 grams deionized water using a Rockwell Drill Press equipped with a 3 inch Cowles blade, mixing at 2000 rpm. The slurry was transferred to a 2000 ml glass beaker, heated to 80–85° C., and the slurry pH was adjusted from an initial pH of 5.9 to 4.5. While maintaining the slurry at about 80° C. and with rapid stirring, 8.0 grams of octyltriethoxysilane (Prosil 9206 from PCR, Incorporated) was added. The treated slurry was aged with rapid stirring for 30 minutes at 80–85° C. followed by oven drying at 110° C. and micronization at 500° F. The micronized pigment was analyzed for acetaldehyde using gas chromatography/mass spectroscopy head space analysis at 150° C. The acetaldehyde evolved from the pigment is shown in Table 1.

Comparative Example 2

An octyltriethoxysilane treated pigment was prepared according to the method of example 1 except the pH of the slurry during silane treatment and aging was adjusted to 6.0. The micronized pigment was analyzed for acetaldehyde using gas chromatography/mass spectroscopy head space analysis at 150° C. The acetaldehyde evolved from the pigment is shown in Table 1.

Comparative Example 3

An octyltriethoxysilane treated pigment was prepared according to the method of example 1 except the pH of the slurry during silane treatment and aging was adjusted to 7.0. The micronized pigment was analyzed for acetaldehyde using gas chromatography/mass spectroscopy head space analysis at 150° C. The acetaldehyde evolved from the pigment is shown in Table 1.

Comparative Example 4

197.9 kilograms of a blue base chloride process $TiO_2$ rutile product was mixed with deionized water so that the final volume of the slurried product was 568.8 liters. The $TiO_2$ slurry was heated with continuous stirring at 60° C. Sufficient phosphoric acid was added to make the system acidic with a pH of 2.1. After a brief aging of 10 minutes, the pH of the slurry was adjusted with caustic to a pH of 5.0. Over a period of 6 minutes 2,137 grams of octyltrichlorosilane was added to the slurry and the pH of the system was adjusted to 6.0 with caustic. After approximately 90 minutes, the slurry was filtered, washed and dried in an oven. The dried octyltrichlorosilane-treated $TiO_2$ was deagglomerated in a fluid energy mill with superheated steam at 240° C. The milled pigment was analyzed for acetaldehyde using gas chromatography/mass spectroscopy head space analysis at 150° C. No acetaldehyde evolved from a sample of this pigment as shown in Table 1.

TABLE 1

| Micrograms of Acetaldehyde Evolved at 150° C. per Gram of $TiO_2$ Pigment | |
| --- | --- |
| Example 1 (Prior Art) | 1.2 |
| Example 2 (Prior Art) | 1.5 |
| Example 3 (Prior Art) | 2.4 |
| Example 4 (This Invention) | 0.0 |

The data in Table 1 show that the hydrophobic $TiO_2$ pigment product of this invention is clearly improved compared to pigments prepared using organotriethoxysilanes of the prior art. The pigment prepared according to this invention evolves no noxious acetaldehyde.

Preparation of Polyethylene Concentrates/Master Batches

50% $TiO_2$:50% polyethylene concentrates were prepared using a Haake Rheocord 9000 Computer Controlled Torque Rheometer. 125 g of $TiO_2$ and 125 g of LDPE 722 manufactured by Dow Chemical Company were dry blended and added to the 75° C. preheated chamber with rotors running at 50 rpm. One minute after addition of the $TiO_2$/LDPE mixture, the chamber temperature was raised to 105° C. Frictional heat generated by the mixing process was allowed to drive the rate of incorporation of the $TiO_2$ into the LDPE until a steady state mixture was achieved.

75% $TiO_2$:25% polyethylene concentrates were prepared using a BR Banbury Mixer. The mixer was preheated to 150° C. While the rotors were turning, 313 grams of LDPE NA 209, manufactured by The Quantum Chemical Company, were added followed by 939 grams of $TiO_2$ which, in turn, was followed by the remaining 313 grams of LDPE NA 209. The ram was lowered and set to 50 psi. The point at which the two materials mix together and flux could be recognized by the ram bouncing up and down and an audible cracking sound. The material was allowed to mix for an additional 3 minutes after flux before opening the mixer and allowing the material to discharge. This material was then cut into ~1 inch pieces while hot. These pieces were then placed into a Cumberland Crusher to obtain finely granulated 75% concentrate samples.

The processibility of inorganic oxides into polymer composites can be judged by evaluating the performance of the inorganic oxide under four test conditions, namely, extruder screen dispersion, melt flow, energy to achieve steady state flux and high temperature stability or lacing performance. Each of these tests requires the use of $TiO_2$/polymer concentrate of one of the types described above.

The extruder screen dispersion test measures how readily the $TiO_2$ disperses in a polymer, e.g. low density polyethylene. 400 grams of a 75% $TiO_2$ concentrate, prepared as described above, is extruded through a Killion 1" extruder, followed by 1500 grams of LDPE, manufactured by The Chevron Chemical Company. The extruder temperatures are set at 350° F. (zone 1), 350° F. (zone 2), 390° F. (zone 3), and a screen pack configuration of 100/400/200/100 mesh screens (from tip of extruder screw to exit port for extrudate) is used. After all of the material has extruded, the screen pack is removed, and the screens are stapled onto an extrusion card. The screens are visually examined under a low power microscope (15×) and assigned screen ratings using standards. A rating of 1 signifies "Best" and 5 "Worst."

The fusion energy, or total torque required to achieve a steady state mixture of $TiO_2$ and polymer, under fixed process conditions, is also a good indicator of processibility. Fusion energy measurements tabulated in Table 2 were obtained during production of 50 weight percent $TiO_2$ concentrates in low density polyethylene using the procedure described above. The total torque required to achieve the steady state mixture is readily obtainable during the production of the concentrates using the software supplied with the Torque Rheometer. Lower fusion energy values indicate that the $TiO_2$ is more readily incorporated into the polymer matrix.

The melt index is another measure, albeit rather rough, indicator of processibility. Melt flows are measured according to ASTM method D1238-90b using 50% concentrates prepared according to the method described above. Higher melt indices imply easier processing.

Lacing is a measure of concentrate volatility at specific weight % pigment loadings and processing temperatures. Lacing tests were conducted on 50% $TiO_2$ concentrate samples prepared according to the method described above. The concentrates were conditioned for 48 hours at 23° C. and 50% relative humidity. The concentrates were then let down into LDPE 722 to achieve a 20% loading of $TiO_2$ in the final film.

Lacing evaluations were run on a 1" Killion extruder equipped with a slot die for fabricating cast films. A temperature profile of 343° C./die, 288° C./adaptor, 232° C./zone 3, 190° C./zone 2, 148° C./zone 1 was used. The screw speed was set at 90 rpm. A Killion 25.4 cm polished chrome chill roll was used to cool and transport the films and was set to maintain a 75 µm film thickness. The chill roll distance from the die lips was 22 mm and the temperature was ~27° C.

After the $TiO_2$/LDPE mix was placed in the hopper, the material was allowed to run until the appearance of white in the clear film was first noted. To ensure the concentration of $TiO_2$ in the film had stabilized, a two minute time interval was allowed before observations were recorded and a film sample taken. The extruder was then purged with LDPE until the film returned to clear.

Lacing performance was ranked by visual observations. Film samples were laid out on a dark surface and ranked according to the relative size and number of holes. A 1.0–3.0 rating system was used. A rating of 1 was given to films with no lacing, 2 was given to films showing the onset of lacing, and 3 was given to films with extreme lacing. Increments of 0.1 were used to give some indication of relative performance between the samples.

Comparative examples 5–8 demonstrate that pigments prepared according to the teachings of this invention maintain equal or improved processibility in polyethylene compared to prior art pigments. This is accomplished in conjunction with the reduced environmental threats of the present inventive process. The pigments of examples 5–8 were prepared in full scale production facilities. Comparisons are made realizing that many factors can influence variability in production processes. Statistical process control techniques were used to minimize variability in the production processes.

Comparative Example 5

Optimized, state-of-the-art production technology was used to prepare a hydrophobic $TiO_2$ pigment using polydimethysiloxane as a treatment for hydrophobizing the $TiO_2$. The pigment was tested in polyethylene for screen dispersion, energy required to mix with polyethylene, melt flow and lacing performance. The results are summarized in Table 2.

Comparative Example 6

Optimized, state-of-the-art production technology was used to prepare a hydrophobic $TiO_2$ pigment using Sylvacote K, a phosphorylated fatty acid derivative, as a treatment of hydrophobizing the $TiO_2$. The pigment was tested in polyethylene for screen dispersion, energy required to mix with polyethylene, melt flow and lacing performance. The results are summarized in Table 2.

Comparative Example 7

Optimized, state-of-the-art production technology was used to prepare a hydrophobic $TiO_2$ pigment using octyltriethoxysilane as a treatment for hydrophobizing the $TiO_2$. The pigment was tested in polyethylene for screen dispersion, energy required to mix with polyethylene, melt flow and lacing performance. The results are summarized in Table 2.

Comparative Example 8

Optimized, state-of-the-art production technology was used to prepare a hydrophobic $TiO_2$ pigment using octyltrichlorosilane as a treatment for hydrophobizing the $TiO_2$. The pigment was tested in polyethylene for screen dispersion, energy required to mix with polyethylene, melt flow and lacing performance. The results are summarized in Table 2.

Comparative Example 9

Optimized, state-of-the-art production technology was used to prepare a hydrophobic $TiO_2$ pigment using hexyltrichlorosilane as a treatment for hydrophobizing the $TiO_2$. The pigment was tested in polyethylene for screen dispersion, energy required to mix with polyethylene, melt flow and lacing performance. The results are summarized in Table 2.

TABLE 2

Processibility Parameters of Hydrophobic TiO₂ Pigments

| | Screen Dispersion | Fusion Energy (m.Kg.M) | Melt Flow (g/10 min) | Lacing |
|---|---|---|---|---|
| Example 5 (prior art) | 2 | 15.4 | 5.5 | 2.0 |
| Example 6 (prior art) | 1 | 10.7 | 5.3 | 1.7 |
| Example 7 (prior art) | 1 | 14.3 | 5.2 | 1.6 |
| Example 8 (this invention) | 1 | 10.2 | 5.7 | 1.6 |
| Example 9 (this invention) | 1 | 14.0 | 5.7 | 1.1 |

The data in Table 2 show that a TiO₂ pigment of this invention provides for processing in polyethylene at least as well as optimized TiO₂ pigments made according to prior art. This is accomplished in conjunction with the reduced environmental threats of the present inventive process.

Upon reading the subject application, various alternative constructions and embodiments will become obvious to those skilled in the art. These variations are to be considered within the scope and spirit of the subject invention. The subject invention is only to be limited by the claims which follow and their equivalents.

We claim:

1. A process for producing a silanized inorganic oxide pigment which comprises adding an inorganic oxide and an organohalosilane represented by the formula $$R_nSiX_{4-n}$$

where R represents a nonhydrolyzable aliphatic, cycloaliphatic or aromatic group having from 1 to 20 carbon atoms or a polyalkylene oxide group; X represents a halogen and n=1, 2, or 3;

to an aqueous media so as to form a slurry, and subjecting the slurry to intense mixing so as to produce a silanized inorganic oxide pigment having a coating formed through a chemical reaction.

2. The process of claim 1 in which the organohalosilane is an organochlorosilane.

3. The process of claim 1 in which R has 4 to 10 carbon atoms.

4. The process of claim 3 in which R has 6 to 8 carbon atoms.

5. The process of claim 2 in which the organochlorosilane is octyltrichlorosilane or hexyltrichlorosilane or mixtures thereof.

6. The process of claim 1 in which the inorganic oxide is titanium dioxide.

7. The process of claim 5 in which the inorganic oxide is titanium dioxide.

8. The process of claim 1 in which the inorganic oxide is selected from the group consisting of zinc oxide, aluminum oxide, silicon dioxide, zirconium oxide, lithipone, lead oxide, chromium oxide pigments, iron oxide pigments and cadmium pigments.

9. The process of claim 1 wherein said intense mixing is at a level sufficient to achieve equilibrium distribution of the organohalosilane throughout the slurry.

10. The process of claim 1 which further comprises adjusting the slurry to acidic pH conditions during the adding step, aging the slurry, neutralizing any acid that may evolve, and recovering the silanized inorganic oxide pigment from the slurry.

11. The process according to claim 10 in which the pH of the slurry is initially between 2 and 6.

12. The process according to claim 11 in which the organohalosilane is added over a time period between about 10 minutes and about 45 minutes.

13. The process according to claim 1 in which the slurry is at to a temperature between 60 and 80° C.

14. The process according to claim 10 in which the pH during the aging of the slurry is between about 2 and about 7.

15. The process according to claim 10 in which the slurry is aged for sufficient time to achieve equilibrium distribution of the organohalosilane and the inorganic oxide.

16. The process according to claim 10 in which the slurry is neutralized to a pH of between about 6.0 to about 9.0.

17. The process according to claim 10 in which the silanized inorganic oxide pigment is wet ground or dry ground.

18. The process of claim 10, wherein the organohalosilane is a mixture of two or more organohalosilanes independently represented by the formula $R_nSiX_{4-n}$ where R represents a nonhydrolyzable aliphatic, cycloaliphatic or aromatic group having 5–10 carbon atoms or a polyalkylene oxide group.

19. A process of claim 1, wherein the inorganic oxide is added to the aqueous media prior to the addition of the organohalosilane.

20. A silanized inorganic oxide pigment produced by the process of claim 1.

21. A silanized inorganic oxide pigment produced by the process of claim 10.

22. A composite comprising a polymer and a silanized inorganic pigment wherein the pigment is produced by the process of claim 1.

23. A polymer composite containing the pigment of claim 20.

* * * * *